(12) United States Patent
Liao et al.

(10) Patent No.: US 9,361,697 B1
(45) Date of Patent: Jun. 7, 2016

(54) GRAPHIC PROCESSING CIRCUIT WITH BINNING RENDERING AND PRE-DEPTH PROCESSING METHOD THEREOF

(71) Applicant: MediaTek Inc., Hsinchu (TW)

(72) Inventors: Ming-Hao Liao, Hsinchu (TW);
Chih-Ching Chen, Hsinchu (TW);
Shih-Chin Lin, Hsinchu (TW);
Hung-Wei Wu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 14/582,134

(22) Filed: Dec. 23, 2014

(51) Int. Cl.
| | |
|---|---|
| G06T 15/50 | (2011.01) |
| G06T 7/00 | (2006.01) |
| G06T 7/40 | (2006.01) |
| G06T 1/20 | (2006.01) |
| G06T 15/00 | (2011.01) |
| G06T 15/80 | (2011.01) |

(52) U.S. Cl.
CPC ............... G06T 7/0051 (2013.01); G06T 1/20 (2013.01); G06T 7/408 (2013.01); G06T 15/005 (2013.01); G06T 15/80 (2013.01)

(58) Field of Classification Search
None
See application file for complete search history.

(56) References Cited

U.S. PATENT DOCUMENTS

| | | | |
|---|---|---|---|
| 6,924,801 | B1 | 8/2005 | Dorbie |
| 7,170,513 | B1 | 1/2007 | Voorhies et al. |
| 8,446,409 | B2 | 5/2013 | Howson |
| 2008/0136816 | A1 | 6/2008 | Morphet |
| 2008/0273031 | A1 | 11/2008 | Shao et al. |
| 2009/0058848 | A1 | 3/2009 | Howson |
| 2013/0194264 | A1 | 8/2013 | Howson |

*Primary Examiner* — Peter Hoang
(74) *Attorney, Agent, or Firm* — Han IP Corporation; Andy M. Han

(57) ABSTRACT

A graphic processing circuit with binning rendering and associated pre-depth processing method is provided. Firstly, a first depth data of a first primitive corresponding to a specified tile is received. Then, the pre-depth data corresponding to the specified tile is read from a pre-Z buffer. If the first depth data is not larger than the pre-depth data and the first primitive is an opaque primitive, the pre-depth data is updated with the first depth data. If the first depth data is not larger than the pre-depth data and the first primitive is a translucent primitive, an uncertainty ordering range is defined according to the first depth data and the pre-depth data, and the pre-depth data is updated with the uncertainty ordering range.

29 Claims, 8 Drawing Sheets

GRAPHIC PROCESSING CIRCUIT WITH BINNING RENDERING AND PRE-DEPTH PROCESSING METHOD THEREOF

TECHNICAL FIELD

The present disclosure relates to a graphic processing circuit and a graphic processing method and, more particularly, to a graphic processing circuit with binning rendering and a pre-depth processing method thereof.

BACKGROUND

Unless otherwise indicated herein, approaches described in this section are not prior art to the claims listed below and are not admitted to be prior art by inclusion in this section.

Recently, with the rapid development of the computer technology and the game software, the 3D games developed according to the 3D displaying technology can provide vivid and gorgeous images. Since the handheld devices are gradually adopted, the 3D displaying technology is gradually applied to the handheld devices. For example, the handheld devices are smart phones, tablet computers or other mobile devices.

Generally, a 3D graphic processing circuit is a core of processing the 3D images. For displaying the exquisite 3D images, the 3D graphic processing circuit has to consume a great deal of electric power. Especially when the 3D graphic processing circuit is disposed in a mobile device, the electric power of the mobile device is quickly consumed.

Therefore, it is important to increase the performance of the 3D graphic processing circuit while reducing the consumption of the electric power and extending the operating time of the mobile device.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

The present disclosure provides a graphic processing circuit and a depth processing method. By using a dual pre-Z testing and occlusion culling mechanism with a binning rendering function, the processing efficiency of a pixel shader circuit of the graphic processing circuit is enhanced.

The present disclosure provides a graphic processing circuit. The graphic processing circuit includes a vertex processing circuit and a pixel processing circuit. The vertex processing circuit includes a geometry processing circuit, a pre-Z testing circuit and a bin store. The geometry processing circuit is used for loading geometry data of a scene and performing a vertex transformation. The pre-Z testing circuit is used for receiving the geometry data after the vertex transformation and segmenting the geometry data in a tile resolution, thereby obtaining pre-depth data of the scene in the tile resolution. The bin store is used for receiving the geometry data after the vertex transformation and segmenting the geometry data in a bin resolution, thereby generating plural bin tables. The pixel processing circuit includes a rasterization processing circuit and a rendering device. The rasterization processing circuit is used for loading the plural bin tables, converting the plural bin tables into plural tiles, classifying the plural converted tiles into a first portion of tiles and a second portion of tiles according to depth data of the converted tiles and the pre-depth data of the scene, and discarding the second portion of tiles. The rendering device is used for receiving and processing the first portion of tiles, thereby generating a color value and a depth value of each pixel of the scene. The geometry data contain vertex data of plural primitives. Each of the vertex data contains a source translucent value for indicating an attribute of the corresponding primitive as an opaque primitive or a translucent primitive.

The present disclosure further provides a pre-depth processing method for a graphic processing circuit. The graphic processing circuit stores a pre-depth data in a pre-Z buffer. Firstly, a first depth data of a first primitive corresponding to a specified tile is received. Then, the pre-depth data corresponding to the specified tile is read from a pre-Z buffer. If the first depth data is not larger than the pre-depth data and the first primitive is an opaque primitive, the pre-depth data is updated with the first depth data. If the first depth data is not larger than the pre-depth data and the first primitive is a translucent primitive, an uncertainty ordering range is defined according to the first depth data and the pre-depth data, and the pre-depth data is updated with the uncertainty ordering range Numerous objects, features and advantages of the present disclosure will be readily apparent upon a reading of the following detailed description of embodiments of the present disclosure when taken in conjunction with the accompanying drawings. However, the drawings employed herein are for the purpose of descriptions and should not be regarded as limiting.

BRIEF DESCRIPTION OF THE DRAWINGS

The above objects and advantages of the present disclosure will become more readily apparent to those ordinarily skilled in the art after reviewing the following detailed description and accompanying drawings, in which.

DETAILED DESCRIPTION OF PREFERRED EMBODIMENTS

Figure 1:
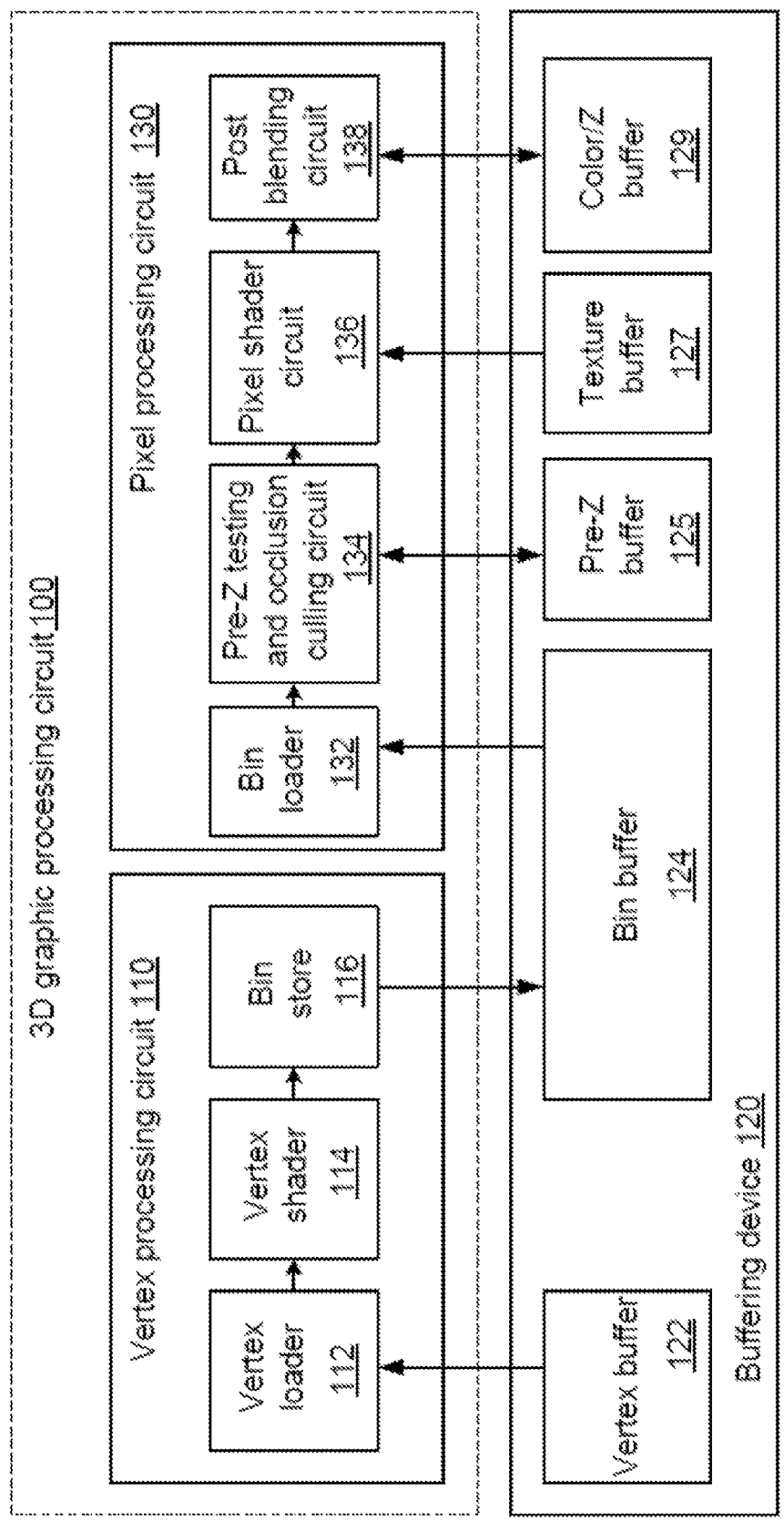
FIG. 1 is a schematic circuit block diagram illustrating a 3D graphic processing circuit.

FIG. 1 is a schematic circuit block diagram illustrating a 3D graphic processing circuit. The 3D graphic processing circuit 100 comprises a vertex processing circuit (VP) 110 and a pixel processing circuit (PP) 130. The 3D graphic processing circuit 100 is connected to a buffering device 120. For example, the buffering device 120 is an internal memory or an external memory such as a static random access memory (SRAM) or a dynamic random access memory (DRAM).

The vertex processing circuit 110 comprises a vertex loader 112, a vertex shader 114 and a bin store 116. The buffering device 120 comprises a vertex buffer 122 and a bin buffer 124. A scene contains plural objects. Each object is composed of plural primitives. An example of the primitive includes but is not limited to a triangle, a quadrangle, a line or a point.

While a scene is processed by the 3D graphic processing circuit 100, the vertex data of all primitives may be temporarily stored into the vertex buffer 122 by an application programming interface (API), and thus these vertex data may be further processed by the vertex processing circuit 110. The vertex data of each primitive contains the position information, the color information and the texture coordinates of all vertexes that constitute the primitive.

The vertex processing circuit 110 converts a frame in the scene from a 3D world space coordinate system to a 2D screen space coordinate system. Firstly, the vertex data of the primitives stored in the vertex buffer 122 are loaded into the vertex loader 112 and transmitted to the vertex shader 114. Consequently, a vertex transformation is performed by the vertex shader 114. The vertex shader 114 may perform a lighting operation and a vertex transformation on the primitives according to programmable shader codes. After the vertex transformation is completed, all primitives are converted to the 2D screen space coordinate system and then transmitted to the bin store 116.

Generally, one scene is divided into plural bins. For example, the size of one bin is 32 pixels×32 pixels. In case that the scene is composed of 1024 pixels×1024 pixels, the scene may be divided into 1024 bins. It should be noted that the size of the bin and the size of the scene are not restricted.

In particular, after the vertex transformation is completed, the relationship between all primitives and the bins are established in the bin store 116 and then stored into the bin buffer 124. For example, if the screen space coordinate of the first primitive after the vertex transformation touches two bins, the vertex data of the first primitive may be recorded into the bin tables of the bin store 116 corresponding to the two bins.

Similarly, after all primitives are subjected to the vertex transformation, the vertex data of all primitives touching each bin may be recorded by the bin store 116. For example, if the screen space coordinates of five primitives after the vertex transformation touch the first bin, the vertex data of the five primitives may be recorded into the bin table corresponding to the first bin. In other words, the bin tables corresponding to all bins may be further stored into the bin buffer 124 by the bin store 116. Moreover, each bin table corresponding to a specified bin contains the vertex data of the primitives touching the specified bin.

The pixel processing circuit 130 comprises a bin loader 132, a pre-Z testing and occlusion culling circuit 134, a pixel shader circuit 136 and a post blending circuit 138. The buffering device 120 further comprises a pre-Z buffer 125, a texture buffer 127 and a color/Z buffer 129.

The bin tables temporarily stored in the bin buffer 124 may be loaded into the bin loader 132 of the pixel processing circuit 130 and then transmitted to the pre-Z testing and occlusion culling circuit 134. After the bin tables are received by the pre-Z testing and occlusion culling circuit 134, the pre-Z testing and occlusion culling circuit 134 may sort the depth data of all primitives in the bin tables. Consequently, the smallest depth data is determined.

During the sorting process, the pre-Z testing and occlusion culling circuit 134 may selectively transmit a specified primitive to the pixel shader circuit 136 according to the result of comparing the depth data of the primitives to be processed with the pre-depth data stored in the pre-Z buffer 125, update the depth data corresponding to the specified primitive, and temporarily store the updated depth data into the pre-Z buffer 125. For example, after the sorting process is completed, the pre-depth data stored in the pre-Z buffer 125 is the smallest depth data. The primitive corresponding to the smallest depth data is the closest to the observer.

The pre-Z testing and occlusion culling circuit 134 may judge the depth data of the specified primitive and compare depth data of the specified primitive with the pre-depth data which is temporarily stored in the pre-Z buffer 125. If the depth data of the specified primitive is larger, the specified primitive is directly culled. On the other hand, if the depth data of the specified primitive is smaller, the pre-depth data temporarily stored in the pre-Z buffer 125 is directly replaced by the depth data of the specified primitive and the specified primitive is transmitted to the pixel shader circuit 136 so as to be processed.

After the depth data of all primitives in the bin table are sorted, the pre-depth data of the pre-Z buffer 125 corresponding to the first bin is the depth data of the primitive which is the closest to the display screen.

After the primitive is received by the pixel shader circuit 136 of the pixel processing circuit 130, the pixel shader circuit 136 performs an arithmetic operation on all pixels of the primitive, selectively reads a specified texture from the texture buffer 127 and transmits the specified texture to the post blending circuit 138. Consequently, the post blending circuit 138 generates the color values and the depth values of all pixels of the scene and stores the color and depth values into the color/Z buffer 129.

As mentioned above, the pre-Z testing and occlusion culling circuit 134 of the 3D graphic processing circuit 100 may compare the depth data of the specified primitive with the pre-depth data and selectively transmits the specified primitive to the pixel shader circuit 136 according to the comparing result. However, since the bin loader 132 of the pixel processing circuit 130 is unable to determine the sequence of inputting the primitives to the pre-Z testing and occlusion culling circuit 134, the processing efficiency of the pixel shader circuit 136 may be impaired.

Figure 2A:
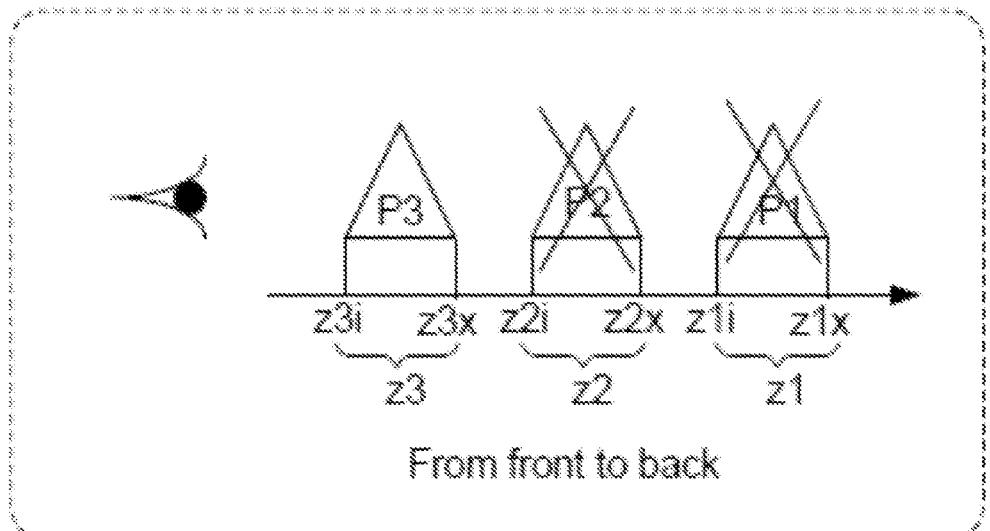
FIGS. 2A and 2B illustrate two sequences of inputting three primitives into the pre-Z testing and occlusion culling circuit of the 3D graphic processing circuit of FIG. 1.
Figure 2B:
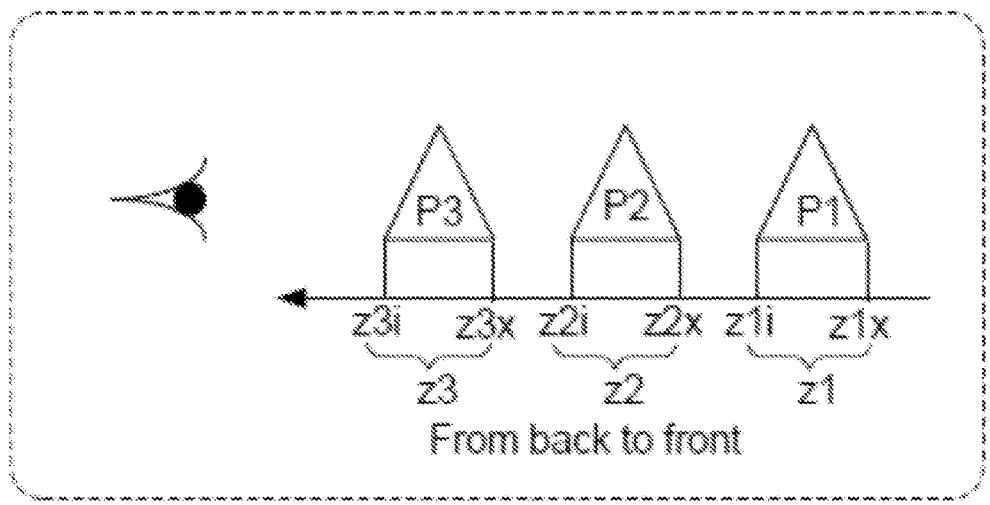

FIGS. 2A and 2B schematically illustrate two sequences of inputting three primitives into the pre-Z testing and occlusion culling circuit 134 of the 3D graphic processing circuit 100 of FIG. 1. The depth data z3 of the primitive P3 contain the maximum depth value $z3x$ and the minimum depth value $z3i$. The maximum depth value $z3x$ denotes the largest distance of the primitive P3 from the eye of the observer, and the minimum depth value $z3i$ denotes the smallest distance of the primitive P3 from the eye of the observer. Similarly, the depth data z2 of the primitive P2 contains the maximum depth value $z2x$ and the minimum depth value $z2i$. The depth data z1 of the primitive P1 contain the maximum depth value $z1x$ and the minimum depth value $z1i$.

As shown in FIG. 2A, the primitive P3 which is the closest to the eye of the observer has the smallest depth data z3, and the primitive P1 which is the farthest from the eye of the observer has the largest depth data z1. In case that the three primitives P3, P2 and P1 sequentially enter the pre-Z testing and occlusion culling circuit 134 in the from-front-to-back order, only the primitive P3 is transmitted to the pixel shader circuit 136 while the primitives P2 and P1 are culled. Under this circumstance, the pixel shader circuit 136 has better processing efficiency.

Please refer to FIG. 2B. In case that the three primitives P1, P2 and P3 sequentially enter the pre-Z testing and occlusion culling circuit 134 in the from-back-to-front order, all of the three primitives P1, P2 and P3 are transmitted to the pixel shader circuit 136 and the depth data stored in the pre-Z buffer 125 is sequentially replaced. Since the primitive P3 has the smallest depth data, the primitives P2 and P1 are obscured by the primitive P3. In fact, the procedures of transmitting the primitives P2 and P1 to the pixel shader circuit 136 are needless. In other words, the sequence of inputting the primitives as shown in FIG. 2B may adversely affect the processing efficiency of the pixel shader circuit 136.

Moreover, if the three primitives are not all opaque primitives, the processing method of the 3D graphic processing circuit 100 becomes more complex. For example, if the primitive P2 as shown in FIGS. 2A and 2B are translucent primitive and the primitives P1 and P3 are opaque primitives, the sequence of inputting the three primitives P1, P2 and P3 may influence the processing result of the 3D graphic processing circuit 100.

Figure 3:
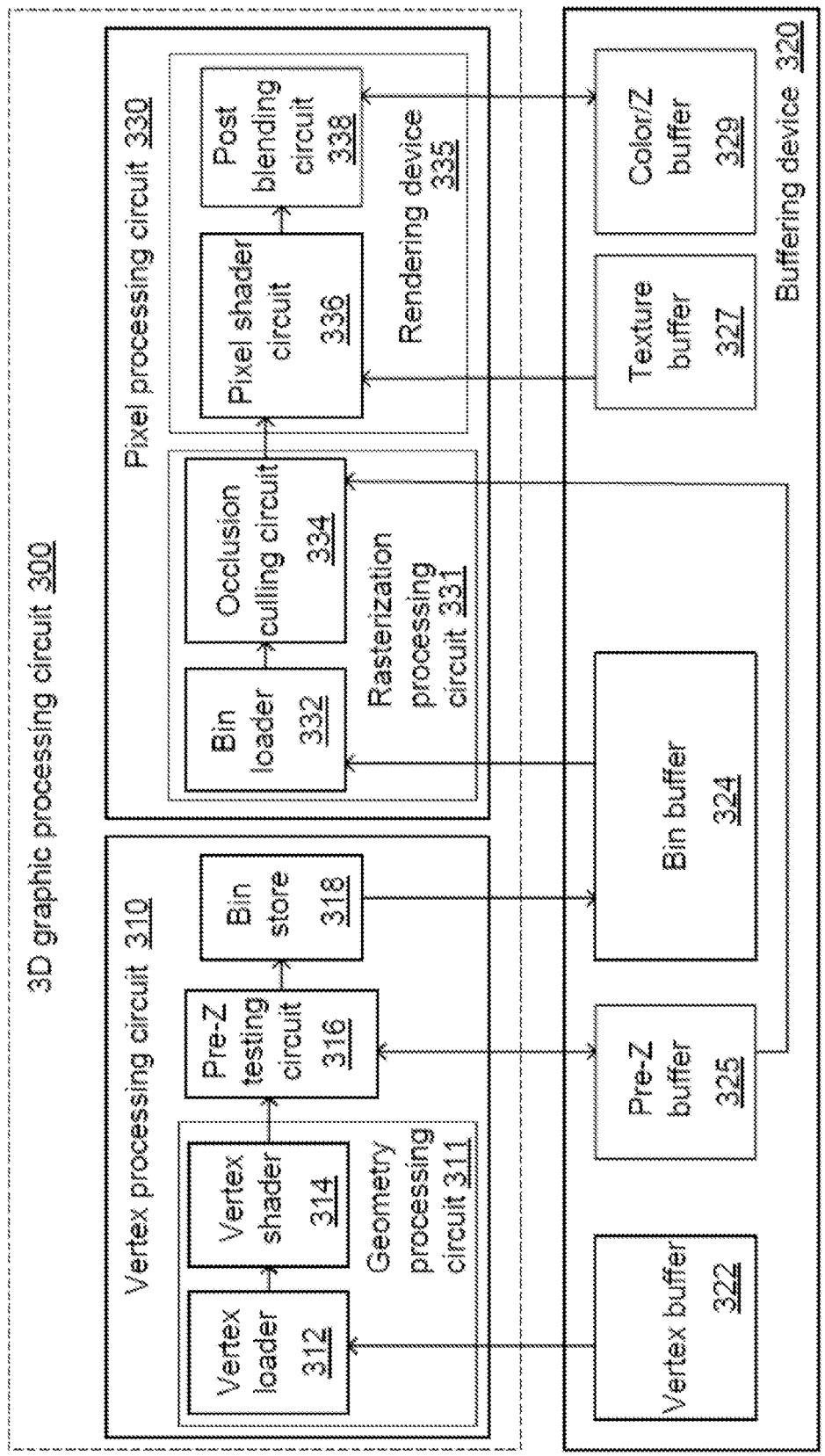
FIG. 3 is a schematic circuit block diagram illustrating a 3D graphic processing circuit according to an embodiment of the present disclosure.

FIG. 3 is a schematic circuit block diagram illustrating a 3D graphic processing circuit 300 according to an embodiment of the present disclosure. The 3D graphic processing circuit 300 comprises a vertex processing circuit (VP) 310 and a pixel processing circuit (PP) 330. The 3D graphic processing circuit 300 is connected to a buffering device 320. For example, the buffering device 320 is an internal memory or an external memory such as a static random access memory (SRAM) or a dynamic random access memory (DRAM).

The 3D graphic processing circuit 300 of the present disclosure is capable of processing opaque primitives and translucent primitives. The operating principles of the vertex processing circuit 310 will be illustrated as follows. The primitives described in this embodiment are all opaque primitives.

The vertex processing circuit 310 comprises a geometry processing circuit 311, a pre-Z testing circuit 316 and a bin store 318. The geometry processing circuit 311 comprises a vertex loader 312 and a vertex shader 314. The buffering device 320 comprises a vertex buffer 322, a pre-Z buffer 325 and a bin buffer 324.

While a scene is processed by the 3D graphic processing circuit 300, the geometry data of all primitives may be temporarily stored into the vertex buffer 322 by an application programming interface (API), and thus these geometry data may be further processed by the vertex processing circuit 310. An example of the primitive includes but is not limited to a quadrangle, a triangle, a line or a point. For example, the geometry data may be a vertex data. The geometry data of each primitive contains the position information, the color information and the texture coordinates of all vertexes that constitute the primitive.

The vertex processing circuit 310 converts a frame in the scene from a 3D world space coordinate system to a 2D screen space coordinate system. The geometry processing circuit 311 loads the geometry data into the vertex processing circuit 310. For example, the geometry data of the primitives stored in the vertex buffer 322 are loaded into the vertex loader 312 and transmitted to the vertex shader 314. Consequently, a vertex transformation is performed by the vertex shader 314. The vertex shader 314 may perform a lighting operation and a vertex transformation on the primitives according to programmable shader codes. After the vertex transformation is completed, all primitives are converted to the 2D screen space coordinate system and then transmitted to the pre-Z testing circuit 316.

In this embodiment, one scene is divided into plural tiles and plural bins. The size of the tile is smaller than the size of the bin. For example, the size of one tile is 4 pixels×4 pixels, and the size of one bin is 32 pixels×32 pixels. In case that the scene is composed of 1024 pixels×1024 pixels, the scene may be divided into 65536 tiles or 1024 bins. It should be noted that the sizes of the tile, the bin and the scene are not restricted.

Moreover, after the vertex transformation is completed, the pre-Z testing circuit 316 will construct the pre-depth data of the whole scene in a tile resolution according to all primitives and store the pre-depth data into the pre-Z buffer 325. For example, after the vertex transformation is completed, the relationship between all primitives and the tiles are established by the pre-Z testing circuit 316 and stored into the pre-Z buffer 325. Preferably, the pre-Z testing circuit 316 may segment the primitives into plural tiles, sort the depth data of all tiles and temporarily store the depth data into the pre-Z buffer 325.

For example, assume that the first primitive, the second primitive and the third primitive touch the first tile after the vertex transformation is performed by the vertex shader 314. The depth data of the first primitive, the second primitive and the third primitive corresponding to the first tile are za, zb and zc, respectively. The depth data za of the first primitive corresponding to the first tile contain the maximum depth value zax and the minimum depth value zai. The depth data zb of the second primitive corresponding to the first tile contain the maximum depth value zbx and the minimum depth value zbi. The depth data zc of the third primitive corresponding to the first tile contain the maximum depth value zcx and the minimum depth value zci. Moreover, zai is larger than zbx, and zbi is larger than zcx.

Firstly, the depth data za of the first primitive corresponding to the first tile is temporarily stored into the pre-Z buffer 325 as a pre-depth data by the pre-Z testing circuit 316.

Then, the pre-Z testing circuit 316 judges the depth data zb of the second primitive corresponding to the first tile. Since the pre-depth data stored in the pre-Z buffer 325 is za and the minimum depth value zai of the pre-depth data za is larger than the maximum depth value zbx of the depth data zb, the first primitive corresponding to the first tile is deeper than the second primitive corresponding to the first tile among the whole scene. Under this circumstance, the first primitive corresponding to the first tile is obscured by the second primitive, and thus the first primitive corresponding to the first tile cannot be shown on the display screen. Meanwhile, the pre-Z testing circuit 316 temporarily stores the depth data zb into the pre-Z buffer 325. Consequently, the depth data zb is the updated pre-depth data in replace of the original pre-depth data za. In other words, the maximum depth value zax of the pre-depth data za is replaced by the maximum depth value zbx of the depth data zb, and the minimum depth value zai of the pre-depth data za is replaced by the minimum depth value zbi of the depth data zb.

Then, the pre-Z testing circuit 316 judges the depth data zc of the third primitive corresponding to the first tile. Since the pre-depth data stored in the pre-Z buffer 325 is zb and the minimum depth value zbi of the pre-depth data zbi is larger than the maximum depth value zcx of the depth data zc, the second primitive corresponding to the first tile is deeper than the third primitive corresponding to the first tile among the whole scene. Under this circumstance, the second primitive corresponding to the first tile is obscured by the third primitive, and thus the second primitive corresponding to the first tile cannot be shown on the display screen. Meanwhile, the pre-Z testing circuit 316 temporarily stores the depth data zc into the pre-Z buffer 325. Consequently, the depth data zc is the updated pre-depth data in replace of the original pre-depth data zb. In other words, the maximum depth value zbx of the pre-depth data zb is replaced by the maximum depth value zcx of the depth data zc, and the minimum depth value zbi of the pre-depth data zb is replaced by the minimum depth value zci of the depth data zc.

In this embodiment, the pre-Z testing circuit 316 may compare the depth data of all primitives corresponding to each tile and determine the pre-depth data corresponding to each tile. After all depth data corresponding to all tiles are sorted, the pre-depth data of the whole scene in the tile resolution are stored in the pre-Z buffer 325.

After the vertex transformation is performed by the vertex shader 314, the vertex data of all primitives are also transmitted to the bin store 318.

The relationship between all primitives and the bins are established by the bin store 318 and then stored into the bin buffer 324. That is, after all primitives are subjected to the vertex transformation, the vertex data of all primitives touching each bin may be recorded by the bin store 318. Meanwhile, a bin table is established. The bin store 318 may store the bin tables of all bins into the bin buffer 324. Each bin table represents the vertex data of the primitives touching the corresponding bin.

In this embodiment, the pixel processing circuit 330 comprises a rasterization processing circuit 331 and a rendering device 335. The rasterization processing circuit 331 comprises a bin loader 332 and an occlusion culling circuit 334. The rendering device 335 comprises a pixel shader circuit 336 and a post blending circuit 338. The buffering device 320 further comprises a texture buffer 327 and a color/Z buffer 329.

The bin tables temporarily stored in the bin buffer 324 may be loaded into the bin loader 332 of the rasterization processing circuit 331 and then transmitted to the occlusion culling circuit 334. After the bin tables are received by the occlusion culling circuit 334, the depth data of all primitives are acquired according to the vertex data of all primitives in the bin tables. The occlusion culling circuit 334 segments and converts each primitive into tiles and calculates the depth data thereof.

The occlusion culling circuit 334 further compares the depth data of the converted tiles with the pre-depth data in the pre-Z buffer 325 and determines whether the depth data of the converted tiles are transmitted to the pixel shader circuit 336 according to a predetermined criterion.

As mentioned above, all pre-depth data of the whole scene have been stored in the pre-Z buffer 325. If the depth data of the tile converted by the occlusion culling circuit 334 is not larger than the corresponding pre-depth data in the pre-Z buffer 325, it means that the converted tile is not obscured. Consequently, the converted tile is transmitted from the occlusion culling circuit 334 to the pixel shader circuit 336.

On the other hand, if the depth data of the tile converted by occlusion culling circuit 334 is larger than the corresponding pre-depth data in the pre-Z buffer 325, it means that the converted tile is obscured. Under this circumstance, the converted tile is directly discarded by the occlusion culling circuit 334 without being transmitted to the pixel shader circuit 336.

As mentioned above, after the occlusion culling circuit 334 receives the bin tables and segments each primitive into the converted tiles, it is not necessary to additionally sort the converted tiles. After the depth data of the converted tiles are compared with the corresponding pre-depth data in the pre-Z buffer 325, the converted tiles requiring further processing are transmitted to the pixel shader circuit 336. Consequently, the processing efficiency of the pixel shader circuit 336 is effectively enhanced.

After the converted tile is received by the pixel shader circuit 336 of the pixel processing circuit 330, the pixel shader circuit 336 performs an arithmetic operation on all pixels of the primitive corresponding to the converted tile, selectively reads a specified texture from the texture buffer 327 and transmits the specified texture to the post blending circuit 338. Consequently, the post blending circuit 338 generates the color values and the depth values of all pixels to be shown on the display screen, and stores the color and depth values into the color/Z buffer 329.

In the 3D graphic processing circuit of this embodiment, the pre-depth data of the whole scene in the tile resolution are firstly acquired by the pre-Z testing circuit 316 of the vertex processing circuit 310 and stored in the pre-Z buffer 325. Then, while the occlusion culling circuit 334 of the pixel processing circuit 330 judges the converted tiles, it is not necessary to additionally sort the converted tiles. After the depth data of the converted tiles are compared with the corresponding pre-depth data in the pre-Z buffer 325, the converted tiles to be processed are transmitted to the pixel shader circuit 336 while the converted tiles which need not be processed are discarded.

It should be noted that numerous modifications and alterations may be made while retaining the teachings of the present disclosure. In some situations, the occlusion culling circuit 334 is possibly unable to judge whether the converted tile is obscured according to the predetermined criterion, and thus the converted tile is also referred as an ambiguous tile. For example, if the maximum depth value or the minimum depth value of the depth data of the converted tile lies in the range between the maximum depth value and the minimum depth value of the pre-depth data, the converted tile is the ambiguous tile. The ambiguous tile may be transmitted from the occlusion culling circuit 334 to the pixel shader circuit 336 in order to be processed.

Preferably, the vertex processing circuit 310 and the pixel processing circuit 330 of the 3D graphic processing circuit 300 may be integrated into an integrated circuit. Preferably, the bin buffer 324, the pre-Z buffer 325 and the 3D graphic processing circuit 300 may be integrated into an integrated circuit in order to increase the overall data accessing efficiency. Alternatively, the bin buffer 324 and the pre-Z buffer 325 are on-die memories such as static random access memories (SRAM) or cache memories.

Figure 4:
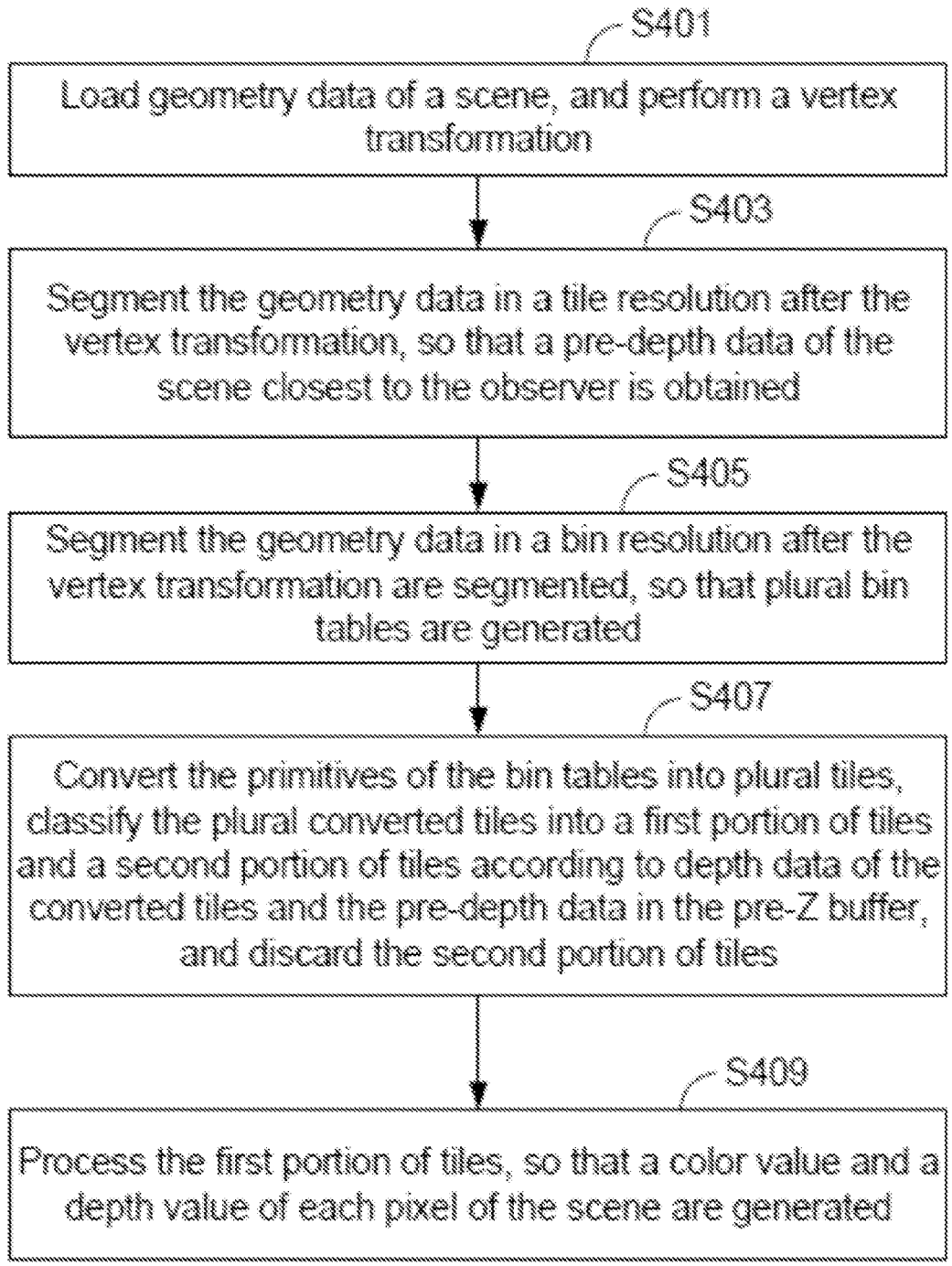
FIG. 4 is a flowchart illustrating a depth processing method for the 3D graphic processing circuit of FIG. 3.

FIG. 4 is a flowchart illustrating a depth processing method for the 3D graphic processing circuit of FIG. 3. Firstly, in a step S401, geometry data of a scene are loaded and a vertex transformation is performed on the geometry data. Then, in a step S403, the geometry data after the vertex transformation are segmented in a tile resolution, so that a pre-depth data of the scene closest to the observer is obtained. Preferably, the pre-depth data is stored in the pre-Z buffer 325. Then, in a step S405, the geometry data after the vertex transformation are segmented in a bin resolution, so that plural bin tables are generated. Then, in a step S407, the primitives of the bin tables are converted into plural tiles, the plural converted tiles are classified into a first portion of tiles and a second portion of tiles according to depth data of the converted tiles and the pre-depth data in the pre-Z buffer, and the second portion of tiles are discarded. Then, in a step S409, the first portion of tiles are processed, so that a color value and a depth value of each pixel of the scene are generated.

In the step S401, the geometry data contain vertex data of plural primitives. In the step S403, the plural primitives after the vertex transformation are segmented in the tile resolution, so that the pre-depth data of the scene in the tile resolution are obtained. In the step S405, the plural primitives after the vertex transformation are segmented in the bin resolution by the bin store 318, so that the plural bin tables are generated.

In the step S407, the plural converted tiles are classified into the first portion of tiles and the second portion of tiles according to a predetermined criterion. According to the predetermined criterion, the converted tiles whose depth data are not larger than the corresponding pre-depth data in the pre-Z buffer are classified as the first portion of tiles, and the converted tiles whose depth data are larger than the corresponding pre-depth data in the pre-Z buffer are classified as the second portion of tiles. Preferably, if the occlusion culling circuit is unable to judge whether the converted tiles are larger than the corresponding pre-depth data in the pre-Z buffer according to the predetermined criterion, the converted tiles are classified as the first portion of tiles.

Moreover, for processing opaque primitives and translucent primitives, a destination translucent value is allocated in the pre-Z buffer 325 for recording the presence of the translucent primitives and depth relationships between the translucent primitives and the opaque primitives. Consequently, the depth data of the translucent primitive between the translucent primitives is not served as the updated pre-depth data of the pre-Z buffer 325.

In comparison with the method of processing the opaque primitives, the procedure of processing the pre-depth data of the translucent primitive by the pre-Z testing circuit 316 of the vertex processing circuit 310 is disclosed. The procedure of processing the translucent primitive by the pixel processing circuit 330 is similar to the procedure of processing the opaque primitives by the pixel processing circuit 330, and is not redundantly described herein.

While a scene is processed by the 3D graphic processing circuit 300, the geometry data of all primitives may be temporarily stored into the vertex buffer 322 by an application programming interface (API), and thus these geometry data may be further processed by the vertex processing circuit 310. For example, the geometry data may be a vertex data. The geometry data of each primitive contains the position information, the color information and the texture coordinates of all vertexes that constitute the primitive and further contains the attribute of the primitive. The attribute of the primitive includes the opaque primitive or the translucent primitive.

The vertex processing circuit converts a frame in the scene from a 3D world space coordinate system to a 2D screen space coordinate system. The geometry processing circuit 311 loads the geometry data into the vertex processing circuit 310.

Firstly, the geometry data of the primitives stored in the vertex buffer 322 are loaded into the vertex loader 312 and transmitted to the vertex shader 314. Consequently, a vertex transformation is performed by the vertex shader 314. The vertex shader 314 may perform a lighting operation and a vertex transformation on the primitives according to programmable shader codes. After the vertex transformation is completed, all primitives are converted to the 2D screen space coordinate system and then transmitted to the pre-Z testing circuit 316.

In this embodiment, one scene is divided into plural tiles and plural bins. The size of the tile is smaller than the size of the bin. For example, the size of one tile is 4 pixels×4 pixels, and the size of one bin is 32 pixels×32 pixels. In case that the scene is composed of 1024 pixels×1024 pixels, the scene may be divided into 65536 tiles or 1024 bins. It should be noted that the sizes of the tile, the bin and the scene are not restricted.

Moreover, after the vertex transformation is completed, the pre-Z testing circuit 316 will construct the pre-depth data of the whole scene in a tile resolution according to all primitives and store the pre-depth data into the pre-Z buffer 325.

In particular, after the vertex transformation is completed, the relationship between all primitives and the tiles are established by the pre-Z testing circuit 316 and stored into the pre-Z buffer 325. Preferably, the 3D graphic processing circuit 300 may segment the primitives into plural tiles. While the pre-Z testing circuit 316 segments the primitives into the plural tiles, the source translucent values corresponding to the segmented tiles are determined according to the attributes of the primitives. Moreover, the pre-Z testing circuit 316 may sort the depth data for all tiles corresponding to a specified tile and temporarily store the pre-depth data into the pre-Z buffer 325.

Depending on the attributes of the primitives and the sequences of loading the primitives, the situation of sorting the primitives and generating the pre-depth data are different.

Figure 5A:
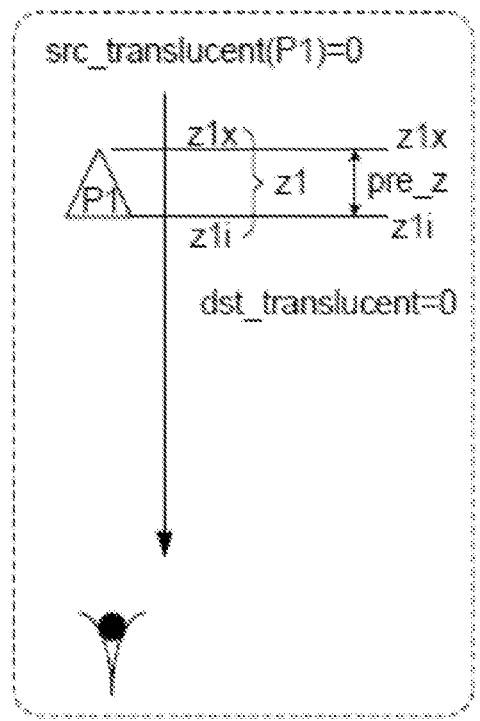
FIGS. 5A~5C schematically illustrate a first exemplary situation of sorting the primitives and generating the pre-depth data.
Figure 5B:
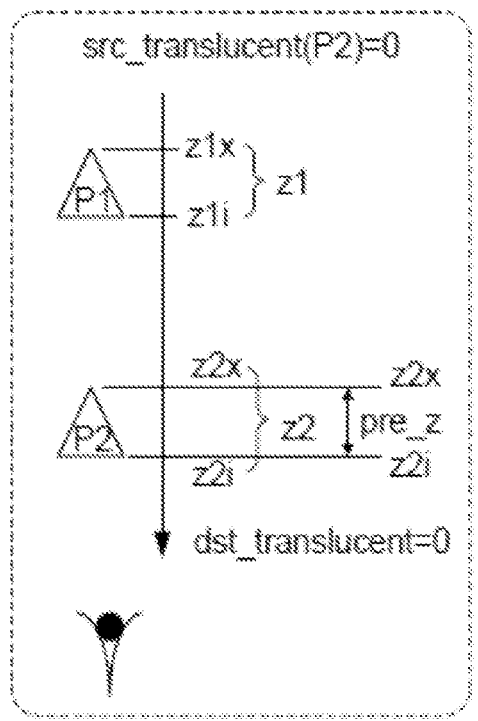
Figure 5C:
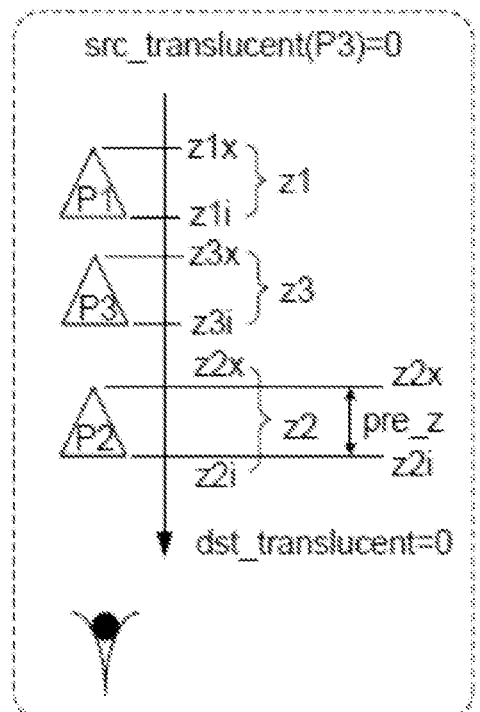

FIGS. 5A~5C illustrate a first exemplary situation of sorting the primitives and generating the pre-depth data. It is assumed that all of a first primitive P1, a second primitive P2 and a third primitive P3 touch the first tile after the vertex transformation is performed by the vertex shader 314. Moreover, the first primitive P1, the second primitive P2 and the third primitive P3 are opaque primitives.

As shown in FIG. 5A, the depth data z1 of the first primitive P1 corresponding to the first tile contain the maximum depth value $z1x$ and the minimum depth value $z1i$. Since the attribute of the first primitive P1 corresponding to the first tile is an opaque attribute, the source translucent value src_translucent(P1) is "0", indicating the opaque attribute. Consequently, the depth data z1 of the first primitive P1 corresponding to the first tile is temporarily stored into the pre-Z buffer 325 as a pre-depth data pre_z by the pre-Z testing circuit 316. The maximum depth value and the minimum depth value of the pre-depth data pre_z corresponding to the first tile are updated with $z1x$ and $z1i$, respectively. Moreover, the destination translucent value dst_translucent is updated with "0", indicating no translucent tile corresponding to the first tile. Alternatively, the temporary pre-depth data pre_z can be buffered in an internal memory, e.g. a pre_z cache, and then the final determined pre_z data are written into the pre-Z buffer 325 to save the DRAM bandwidth.

Then, as shown in FIG. 5B, the depth data z2 of the second primitive P2 corresponding to the first tile contain the maximum depth value $z2x$ and the minimum depth value $z2i$. Since the attribute of the second primitive P2 corresponding to the first tile is an opaque attribute, the source translucent value src_translucent(P2) is "0", indicating the opaque attribute. Since the maximum depth value $z2x$ of the depth data z2 is smaller than the minimum depth value $z1i$ of the depth data z1, the first primitive P1 corresponding to the first tile is obscured by the second primitive P2 corresponding to the first tile. Consequently, the depth data z2 is stored in the pre-Z buffer 325 as the updated pre-depth data pre_z. That is, the maximum depth value and the minimum depth value of the pre-depth data pre_z corresponding to the first tile are updated with $z2x$ and $z2i$, respectively. Moreover, the destination translucent value dst_translucent is maintained at "0", indicating no translucent tile corresponding to the first tile.

Then, as shown in FIG. 5C, the depth data z3 of the third primitive P3 corresponding to the first tile contain the maximum depth value $z3x$ and the minimum depth value $z3i$. Since the attribute of the third primitive P3 corresponding to the first tile is an opaque attribute, the source translucent value src_translucent(P3) is "0", indicating the opaque attribute. Since the maximum depth value z2x of the depth data z2 is smaller than the minimum depth value z3i of the depth data z3, the third primitive P3 corresponding to the first tile is obscured by the second primitive P2 corresponding to the first tile. Consequently, the depth data z3 is not served as the updated pre-depth data of the pre-Z buffer 325. That is, the maximum depth value and the minimum depth value of the pre-depth data pre_z corresponding to the first tile maintained at z2x and z2i, respectively. Moreover, the destination translucent value dst_translucent is maintained at "0", indicating no translucent tile corresponding to the first tile.

Figure 6A:
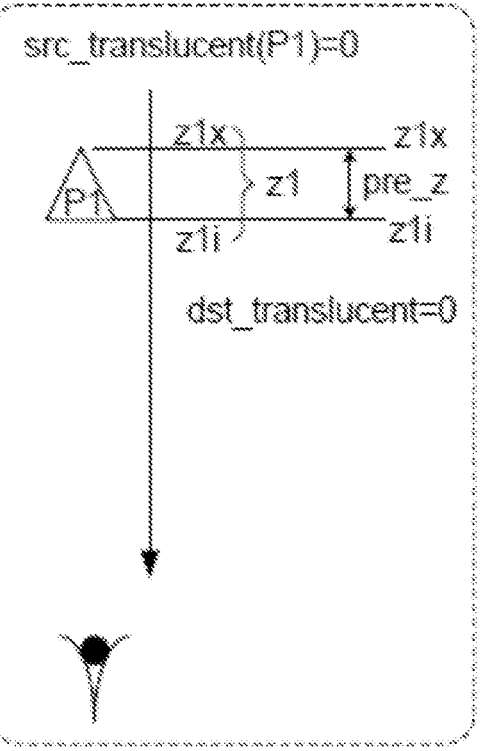
FIGS. 6A~6C illustrate a second exemplary situation of sorting the primitives and generating the pre-depth data.
Figure 6B:
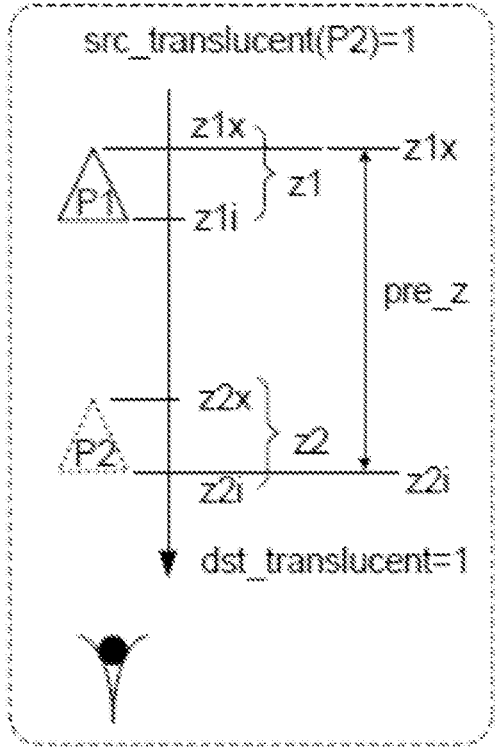
Figure 6C:
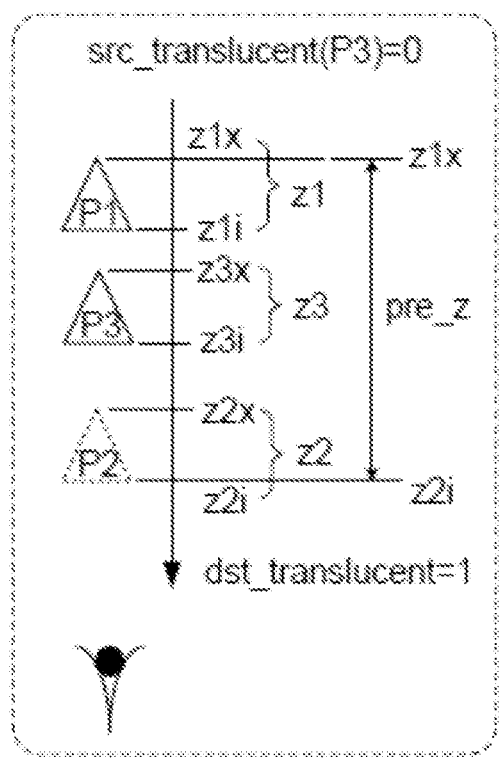

FIGS. 6A~6C illustrate a second exemplary situation of sorting the primitives and generating the pre-depth data. It is assumed that all of a first primitive P1, a second primitive P2 and a third primitive P3 touch the first tile after the vertex transformation is performed by the vertex shader 314. Moreover, the first primitive P1 and the third primitive P3 are opaque primitives, and the second primitive P2 is a translucent primitive.

As shown in FIG. 6A, the depth data z1 of the first primitive P1 corresponding to the first tile contain the maximum depth value z1x and the minimum depth value z1i. Since the attribute of the first primitive P1 corresponding to the first tile is an opaque attribute, the source translucent value src_translucent(P1) is "0", indicating the opaque attribute. Consequently, the depth data z1 of the first primitive P1 corresponding to the first tile is temporarily stored into the pre-Z buffer 325 as a pre-depth data pre_z by the pre-Z testing circuit 316. The maximum depth value and the minimum depth value of the pre-depth data pre_z corresponding to the first tile are updated with z1x and z1i, respectively. Moreover, the destination translucent value dst_translucent is updated with "0", indicating no translucent tile corresponding to the first tile. Alternatively, the temporary pre-depth data pre_z can be buffered in an internal memory, e.g. a pre_z cache, and then the final determined pre_z data are written into the pre-Z buffer 325 to save the DRAM bandwidth.

Then, as shown in FIG. 6B, the depth data z2 of the second primitive P2 corresponding to the first tile contain the maximum depth value z2x and the minimum depth value z2i. Since the attribute of the second primitive P2 corresponding to the first tile is a translucent attribute, the source translucent value src_translucent(P2) is "1", indicating the translucent attribute. Since the translucent second primitive P2 is arranged between the pre-depth data pre_z corresponding to the first tile and the eye of the observer, the minimum depth value of the pre-depth data pre_z is updated with the minimum depth value z2i of the depth data z2 of the translucent second primitive P2. That is, the minimum depth value z2i of the depth data z2 is stored in the pre-Z buffer 325 as the minimum depth value of the updated pre-depth data pre_z. After the procedure of updating the pre-depth data pre_z is completed, the maximum depth value of the pre-depth data pre_z is maintained at z1x but the minimum depth value of the pre-depth data pre_z is updated with z2i (see FIG. 5B). Moreover, the destination translucent value dst_translucent is updated with "1", indicating the presence of a translucent tile corresponding to the first tile.

Then, as shown in FIG. 6C, the depth data z3 of the third primitive P3 corresponding to the first tile contain the maximum depth value z3x and the minimum depth value z3i. Since the attribute of the third primitive P3 corresponding to the first tile is an opaque attribute, the source translucent value src_translucent(P3) is "0", indicating the opaque attribute. Since the depth data z3 of the third primitive P3 corresponding to the first tile lies within the range of the pre-depth data pre_z, the depth data z3 is not served as the updated pre-depth data of the pre-Z buffer 325. That is, the maximum depth value of the pre-depth data pre_z is maintained at z1x and the minimum depth value of the pre-depth data pre_z is maintained at z2i. Moreover, the destination translucent value dst_translucent is maintained as "1", indicating the presence of a translucent primitive corresponding to the first tile.

In this embodiment, when a translucent second primitive appears between the pre-depth data pre_z corresponding to the first tile and the eye of the observer, the range of the pre-depth data pre_z is expanded. Since the destination translucent value dst_translucent is "1", the range of the pre-depth data pre_z represents an uncertainty ordering range. While all converted tiles corresponding to the first tile are processed by the occlusion culling circuit 334, the converted tiles within the uncertainty ordering range are transmitted to the rendering device 335.

If the above approach of processing the translucent primitive is not done, the depth data of the primitive closet to the eye of the observer is the updated pre-depth data pre_z. In other words, the first primitive P1 and the third primitive P3 are culled by the occlusion culling circuit 334. Under this circumstance, an erroneous ordering may occur. In this embodiment, a destination translucent value is applied to indicate an uncertainty ordering range for the pre-depth data pre_z. Consequently, the erroneous ordering can be avoided.

Figure 7:
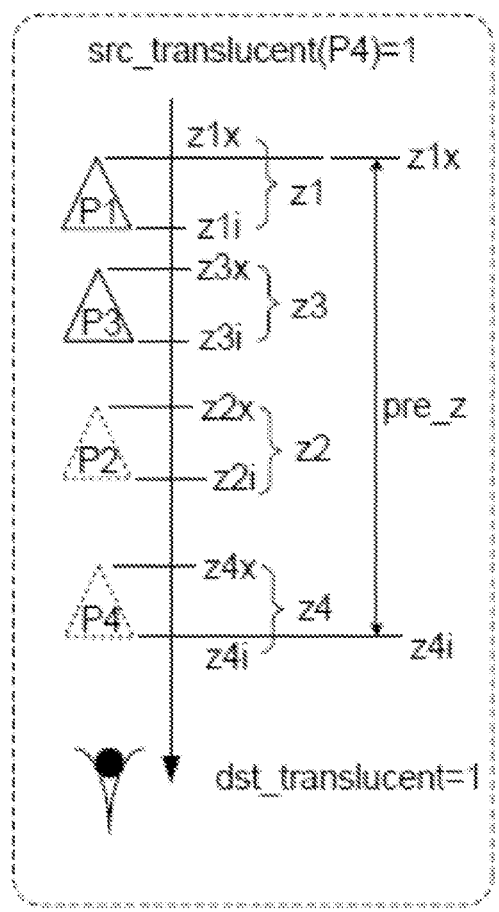
FIG. 7 illustrates a third exemplary situation of sorting the primitives and generating the pre-depth data.

FIG. 7 illustrates a third exemplary situation of sorting the primitives and generating the pre-depth data. Firstly, the procedures as shown in FIGS. 6A~6C are performed. Then, the vertex transformation is performed on a fourth primitive P4 by the vertex shader 314. It is assumed that the fourth primitive P4 touches the first tile after the vertex transformation is performed by the vertex shader 314. Moreover, the fourth primitive P4 is a translucent primitive.

As shown in FIG. 7, the depth data z4 of the fourth primitive P4 corresponding to the first tile contain the maximum depth value z4x and the minimum depth value z4i. Since the attribute of the fourth primitive P4 corresponding to the first tile is a translucent attribute, the source translucent value src_translucent(P4) is "1", indicating the translucent attribute. Since the translucent second primitive P2 is arranged between the pre-depth data pre_z corresponding to the first tile and the eye of the observer, the minimum depth value of the pre-depth data pre_z is updated with the minimum depth value z4i of the depth data z4 of the translucent fourth primitive P4. That is, the minimum depth value z4i of the depth data z4 is stored in the pre-Z buffer 325 as the minimum depth value of the updated pre-depth data pre_z. After the procedure of updating the pre-depth data pre_z is completed, the maximum depth value of the pre-depth data pre_z is maintained at z1x but the minimum depth value of the pre-depth data pre_z is updated with z4i (see FIG. 7). Moreover, the destination translucent value dst_translucent is updated with "1", indicating the presence of a translucent tile corresponding to the first tile. Moreover, the range of the pre-depth data pre_z is an uncertainty ordering range. In other words, the uncertainty ordering range as shown in FIG. 7 is expanded because of the translucent fourth primitive P4. Alternatively, the temporary pre-depth data pre_z can be buffered in an internal memory, e.g. a pre_z cache, and then the final determined pre_z data are written into the pre-Z buffer 325 to save the DRAM bandwidth.

Figure 8:
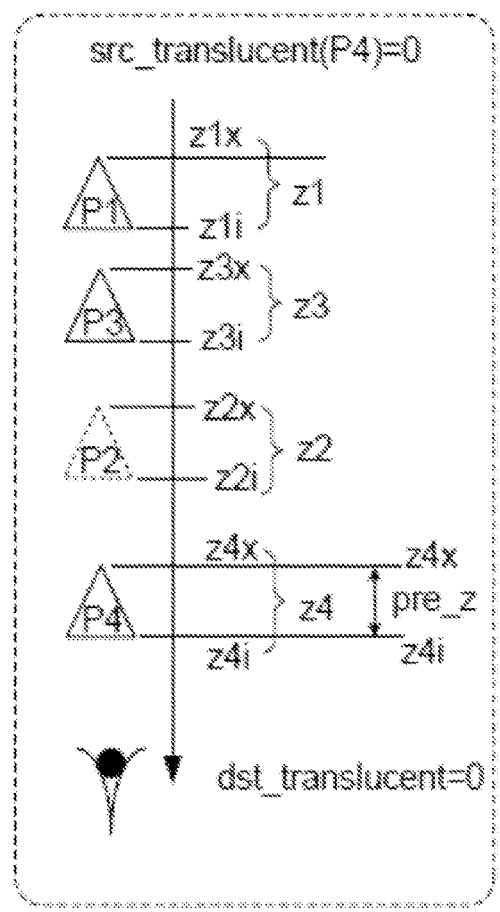
FIG. 8 illustrates a fourth exemplary situation of sorting the primitives and generating the pre-depth data.

FIG. 8 illustrates a fourth exemplary situation of sorting the primitives and generating the pre-depth data. Firstly, the procedures as shown in FIGS. 6A~6C are performed. Then, the vertex transformation is performed on a fourth primitive P4 by the vertex shader 314. It is assumed that the fourth primitive P4 touches the first tile after the vertex transformation is performed by the vertex shader 314. Moreover, the fourth primitive P4 is an opaque primitive.

As shown in FIG. 8, the depth data z4 of the fourth primitive P4 corresponding to the first tile contain the maximum depth value z4x and the minimum depth value z4i. Since the attribute of the fourth primitive P4 corresponding to the first tile is an opaque attribute, the source translucent value src_translucent(P4) is "0", indicating the opaque attribute. After the procedure of updating the pre-depth data pre_z is completed, the maximum depth value of the pre-depth data pre_z is updated with z4x and the minimum depth value of the pre-depth data pre_z is updated with z4i (see FIG. 8). Moreover, the destination translucent value dst_translucent is updated with "0", indicating an opaque status corresponding to the first tile.

Figure 9:
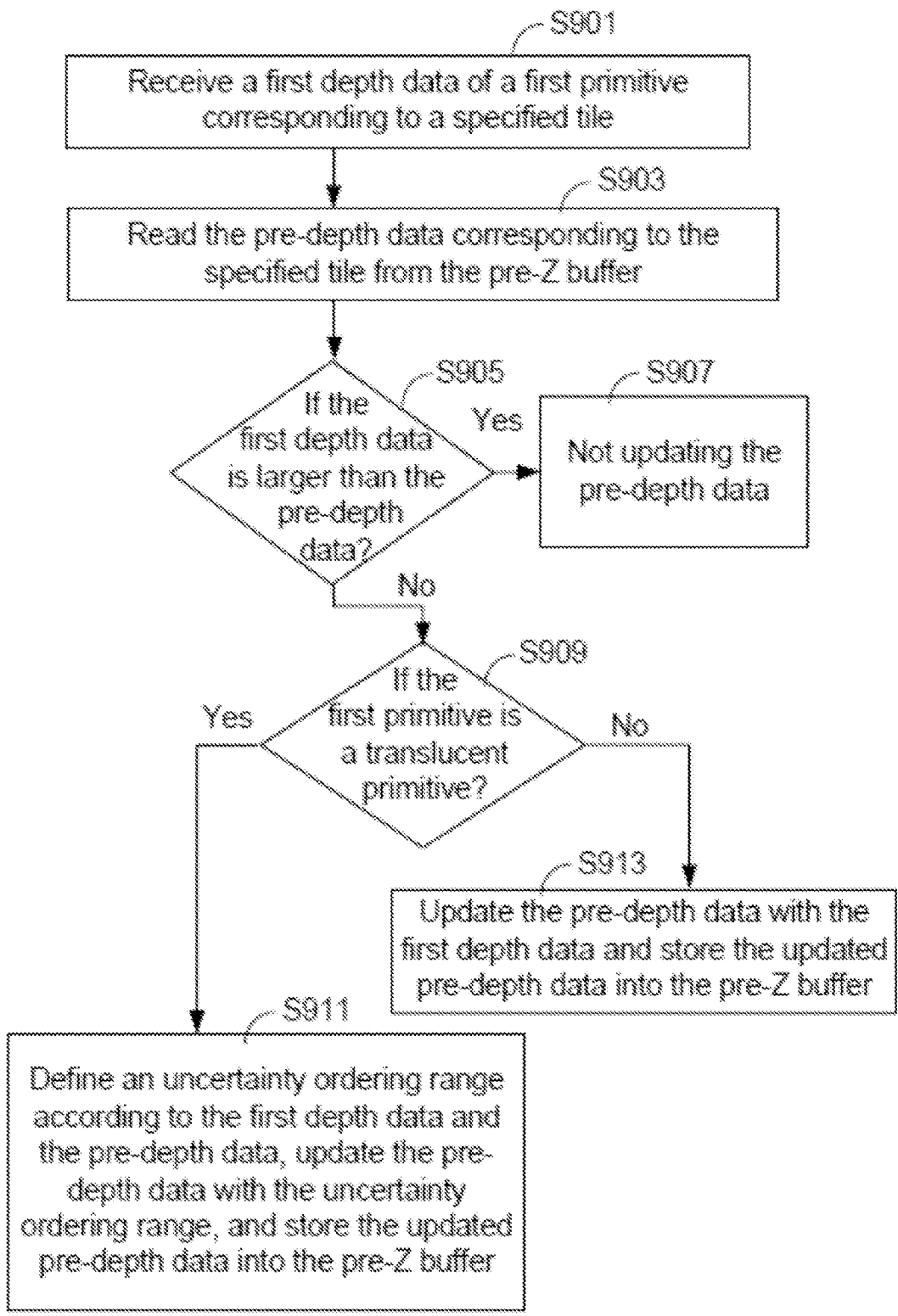
FIG. 9 is a flowchart illustrating a pre-depth processing method for the 3D graphic processing circuit of FIG. 3.

FIG. 9 is a flowchart illustrating a pre-depth processing method. Firstly, a first depth data of a first primitive corresponding to a specified tile is received (Step S901). Then, a pre-depth data corresponding to the specified tile is read from the pre-Z buffer (Step S903).

Then, a step S905 is performed to judge whether the first depth data is larger than the pre-depth data. If the first depth data is larger than the pre-depth data, it means that the first primitive corresponding to the specified tile is obscured. The pre-depth data in the pre-Z buffer is not updated (Step S907).

On the other hand, if the first depth data is not larger than the pre-depth data, it means that the first primitive corresponding to the specified tile is not obscured. The pre-depth data in the pre-Z buffer needs to be updated. Then, a step S909 is performed to judge whether the first primitive is a translucent primitive. For example, according to the source translucent value of the geometry data corresponding to the first primitive, the first primitive is determined as the translucent primitive or the opaque primitive.

If the first primitive is the opaque primitive, the primitives behind the first primitive corresponding to the specified tile are obscured by the first primitive. Consequently, the first depth data is applied to update the pre-depth data and stored in the pre-Z buffer (Step S913).

If the first primitive is the translucent primitive, the primitives behind the first primitive corresponding to the specified tile are not obscured by the first primitive. Consequently, an uncertainty ordering range is defined according to the first depth data and the pre-depth data, and the uncertainty ordering range is served as the updated pre-depth data and stored into the pre-Z buffer (Step S911). For example, the uncertainty ordering range is determined by the maximum depth value and the minimum depth value of the original pre-depth data and the maximum value and the minimum value of the first depth data. Moreover, the destination translucent value may indicate that the first primitive corresponding to the specified tile is translucent.

After all primitives touching the specified tile are processed by the above procedures of FIG. 9, the pre-depth data stored in the pre-Z buffer can be further processed by the occlusion culling circuit 334.

It should be noted that numerous modifications and alterations may be made while retaining the teachings of the present disclosure. For example, in another embodiment, the minimum value of the pre-depth data may be discarded in order to save the bandwidth between the 3D graphic processing circuit 300 and the pre-Z buffer 325. That is, the pre-depth data only contain a maximum depth value and a destination translucent value. For example, in FIG. 5A, the maximum depth value of the pre-depth data pre_z is updated with z1x, and the destination translucent value dst_translucent is set as "0". In FIG. 5B, the maximum depth value of the pre-depth data pre_z is updated with z2x, and the destination translucent value dst_translucent is set as "0". In FIG. 5C, the pre-depth data pre_z is not updated. Moreover, if the destination translucent value dst_translucent of the pre-depth data has been set as "1", it means that a translucent object is within the uncertainty ordering range. Under this circumstance, it is not necessary to update the maximum depth value of the pre-depth data pre_z. For example, as shown in FIGS. 6B, 6C, 7 and 8, the destination translucent value dst_translucent of the pre-depth data has been set as "1". Consequently, the maximum depth value of the pre-depth data pre_z is not updated.

From the above descriptions, the 3D graphic processing circuit of the present disclosure has a binning rendering function. The 3D graphic processing circuit 300 of the present disclosure is capable of processing opaque primitives and translucent primitives. After the vertex transformation is completed, the pre-Z testing circuit 316 of the vertex processing circuit 310 will construct the pre-depth data of the whole scene in a tile resolution and store the pre-depth data into the pre-Z buffer 325. Moreover, the converted tiles which need not be processed are discarded by the occlusion culling circuit 334 of the pixel processing circuit 330. Consequently, the processing efficiency of the pixel shader circuit 336 is effectively enhanced.

While the present disclosure has been described in terms of what is presently considered to be the most practical and preferred embodiments, it is to be understood that the present disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A graphic processing circuit, comprising:
   a vertex processing circuit comprising:
      a geometry processing circuit for loading geometry data of a scene and performing a vertex transformation;
      a pre-Z testing circuit for receiving the geometry data after the vertex transformation and segmenting the geometry data in a tile resolution, thereby obtaining pre-depth data of the scene in the tile resolution; and
      a bin store for receiving the geometry data after the vertex transformation and segmenting the geometry data in a bin resolution, thereby generating plural bin tables; and
   a pixel processing circuit comprising:
      a rasterization processing circuit for loading the plural bin tables, converting the plural bin tables into plural tiles, classifying the plural converted tiles into a first portion of tiles and a second portion of tiles according to depth data of the converted tiles and the pre-depth data of the scene, and discarding the second portion of tiles; and
      a rendering device for receiving and processing the first portion of tiles, thereby generating a color value and a depth value of each pixel of the scene,
   wherein the geometry data contain vertex data of plural primitives, and each of the vertex data contains a source translucent value for indicating an attribute of the corresponding primitive as an opaque primitive or a translucent primitive.

2. The graphic processing circuit as claimed in claim 1, wherein the geometry processing circuit comprises:
   a vertex loader for loading the geometry data of the scene; and
   a vertex shader for receiving the vertex data of the plural primitives from the vertex loader and performing the vertex transformation.

3. The graphic processing circuit as claimed in claim 2, wherein the vertex data of the plural primitives after the vertex transformation are further received by the pre-Z testing circuit, and the plural primitives are segmented in the tile resolution by the pre-Z testing circuit, so that the pre-depth data of the scene in the tile resolution are obtained.

4. The graphic processing circuit as claimed in claim 3, wherein the pre-Z testing circuit receives a first depth data of a first primitive of the plural primitives corresponding to a specified tile, and reads the pre-depth data corresponding to the specified tile from the pre-Z buffer, wherein if the first depth data is not larger than the pre-depth data and the first primitive is the opaque primitive, the first depth data is served as an updated pre-depth data and stored into the pre-Z buffer, wherein if the first depth data is not larger than the pre-depth data and the first primitive is the translucent primitive, an uncertainty ordering range is defined according to the first depth data and the pre-depth data, and the uncertainty ordering range is served as the updated pre-depth data and stored into the pre-Z buffer.

5. The graphic processing circuit as claimed in claim 4, wherein the first depth data contains a maximum depth value, a minimum depth value and the source translucent value.

6. The graphic processing circuit as claimed in claim 5, wherein the first primitive is determined as the opaque primitive or the translucent primitive according to the source translucent value of the first depth data.

7. The graphic processing circuit as claimed in claim 6, wherein the pre-depth data contains a maximum depth value, a minimum depth value and a destination translucent value.

8. The graphic processing circuit as claimed in claim 7, wherein if the first depth data is served as an updated pre-depth data, the maximum depth value of the pre-depth data is replaced by the maximum depth value of the first depth data, the minimum depth value of the pre-depth data is replaced by the minimum depth value of the first depth data, and the destination translucent value of the pre-depth data is replaced by the source translucent value of the first depth data.

9. The graphic processing circuit as claimed in claim 7, wherein if the uncertainty ordering range is defined according to the first depth data and the pre-depth data, the minimum depth value of the pre-depth data is replaced by the minimum depth value of the first depth data, and the destination translucent value of the pre-depth data is replaced by the source translucent value of the first depth data.

10. The graphic processing circuit as claimed in claim 3, wherein the vertex data of the plural primitives after the vertex transformation are further received by the bin store, and the plural primitives are segmented in the bin resolution by the bin store, so that the plural bin tables are generated.

11. The graphic processing circuit as claimed in claim 10, wherein the vertex data of the plural primitives are loaded into the vertex loader from a vertex buffer.

12. The graphic processing circuit as claimed in claim 10, wherein the bin store further stores the plural bin tables into a bin buffer.

13. The graphic processing circuit as claimed in claim 10, wherein the pre-Z testing circuit further stores the pre-depth data of the scene into a pre-Z buffer.

14. The graphic processing circuit as claimed in claim 13, wherein the rasterization processing circuit comprises:
   a bin loader for loading the plural bin tables; and
   an occlusion culling circuit for converting the plural bin tables into the plural converted tiles, classifying the plural converted tiles into the first portion of tiles and the second portion of tiles according to according to the depth data of the converted tiles and the pre-depth data of the scene, and discarding the second portion of tiles.

15. The graphic processing circuit as claimed in claim 14, wherein the occlusion culling circuit classifies the plural converted tiles into the first portion of tiles and the second portion of tiles according to a predetermined criterion.

16. The graphic processing circuit as claimed in claim 15, wherein according to the predetermined criterion, the converted tiles whose depth data are not larger than the corresponding pre-depth data in the pre-Z buffer are classified as the first portion of tiles, and the converted tiles whose depth data are larger than the corresponding pre-depth data in the pre-Z buffer are classified as the second portion of tiles.

17. The graphic processing circuit as claimed in claim 16, wherein if the occlusion culling circuit is unable to judge whether the converted tiles are larger than the corresponding pre-depth data in the pre-Z buffer according to the predetermined criterion, the converted tiles are classified as the first portion of tiles.

18. The graphic processing circuit as claimed in claim 1, wherein the rendering device comprises:
   a pixel shader circuit for receiving and processing the first portion of tiles; and a post blending circuit for generating the color value and the depth value of each pixel of the scene.

19. The graphic processing circuit as claimed in claim 1, wherein the pre-Z testing circuit further stores the pre-depth data of the scene into a pre-Z buffer, and the bin store further stores the plural bin tables into a bin buffer.

20. The graphic processing circuit as claimed in claim 1, wherein the graphic processing circuit is integrated into an integrated circuit.

21. A pre-depth processing method for a graphic processing circuit, the graphic processing circuit storing a pre-depth data in a pre-Z buffer, the pre-depth processing method comprising steps of:
  storing a first depth data of a first primitive corresponding to a specified tile as the pre-depth data;
  receiving a second depth data of a second primitive corresponding to the specified tile;
  reading the pre-depth data corresponding to the specified tile from the pre-Z buffer;
  updating the pre-depth data with the second depth data if the second depth data is not larger than the pre-depth data and the second primitive is an opaque primitive; and
  defining an uncertainty ordering range according to the second depth data and the pre-depth data and updating the pre-depth data with the uncertainty ordering range if the second depth data is not larger than the pre-depth data and the second primitive is a translucent primitive.

22. The pre-depth processing method as claimed in claim 21, wherein the second depth data contains a maximum depth value, a minimum depth value and a source translucent value.

23. The pre-depth processing method as claimed in claim 22, wherein the second primitive is determined as the opaque primitive or the translucent primitive according to the source translucent value of the second depth data.

24. The pre-depth processing method as claimed in claim 22, wherein the pre-depth data contains a maximum depth value, a minimum depth value and a destination translucent value.

25. The pre-depth processing method as claimed in claim 24, wherein if the pre-depth data is updated with the second depth data, the maximum depth value of the pre-depth data is replaced by the maximum depth value of the second depth data, the minimum depth value of the pre-depth data is replaced by the minimum depth value of the second depth data, and the destination translucent value of the pre-depth data is replaced by the source translucent value of the second depth data.

26. The pre-depth processing method as claimed in claim 24, wherein if the uncertainty ordering range is defined according to the second depth data and the pre-depth data, the minimum depth value of the pre-depth data is replaced by the minimum depth value of the second depth data, and the destination translucent value of the pre-depth data is replaced by the source translucent value of the second depth data.

27. The pre-depth processing method as claimed in claim 22, wherein the pre-depth data contains a maximum depth value and a destination translucent value.

28. The pre-depth processing method as claimed in claim 27, wherein if the pre-depth data is updated with the second depth data, the maximum depth value of the pre-depth data is replaced by the maximum depth value of the second depth data, and the destination translucent value of the pre-depth data is replaced by the source translucent value of the second depth data.

29. The pre-depth processing method as claimed in claim 27, wherein if the uncertainty ordering range is defined according to the second depth data and the pre-depth data, the destination translucent value of the pre-depth data is replaced by the source translucent value of the second depth data.

* * * * *